(12) United States Patent
Chen

(10) Patent No.: US 8,885,459 B2
(45) Date of Patent: Nov. 11, 2014

(54) SYSTEM AND METHOD FOR COMPUTING A BACKUP INGRESS OF A POINT-TO-MULTIPOINT LABEL SWITCHED PATH

(75) Inventor: Huaimo Chen, Bolton, MA (US)

(73) Assignee: Futurewei Technologies, Inc., Plano, TX (US)

(*) Notice: Subject to any disclaimer, the term of this patent is extended or adjusted under 35 U.S.C. 154(b) by 378 days.

(21) Appl. No.: 13/033,125

(22) Filed: Feb. 23, 2011

(65) Prior Publication Data

US 2011/0211445 A1  Sep. 1, 2011

Related U.S. Application Data

(60) Provisional application No. 61/308,835, filed on Feb. 26, 2010.

(51) Int. Cl.
| | |
|---|---|
| *H04L 12/28* | (2006.01) |
| *H04L 12/761* | (2013.01) |
| *H04L 12/717* | (2013.01) |
| *H04L 12/703* | (2013.01) |
| *H04L 12/723* | (2013.01) |

(52) U.S. Cl.
CPC ............ *H04L 45/42* (2013.01); *H04L 45/16* (2013.01); *H04L 45/28* (2013.01); *H04L 45/50* (2013.01)
USPC ............ 370/221; 370/219; 370/254; 370/390

(58) Field of Classification Search
USPC ............... 370/216–228, 235–238, 252–254, 370/389–400
See application file for complete search history.

(56) References Cited

U.S. PATENT DOCUMENTS

| | | | |
|---|---|---|---|
| 6,751,190 B1 | 6/2004 | Swallow | |
| 7,269,132 B1 | 9/2007 | Casey et al. | |
| 7,286,467 B1 | 10/2007 | Sylvain | |
| 7,345,991 B1 | 3/2008 | Shabtay et al. | |
| 7,477,642 B2 * | 1/2009 | Aggarwal et al. | 370/390 |
| 7,886,079 B2 | 2/2011 | Vasseur et al. | |
| 8,331,220 B2 | 12/2012 | Kitada | |

(Continued)

FOREIGN PATENT DOCUMENTS

| | | |
|---|---|---|
| CN | 101163105 A | 4/2008 |
| CN | 101228739 A | 7/2008 |

(Continued)

OTHER PUBLICATIONS

Vasseur et al, path computation element communication protocol dratft-ietf-pce-pcep-03, Oct. 2006.*

(Continued)

*Primary Examiner* — Michael Thier
*Assistant Examiner* — Vincelas Louis
(74) *Attorney, Agent, or Firm* — Conley Rose, P.C.; Grant Rodolph; William H. Dietrich

(57) ABSTRACT

Disclosed is an apparatus that includes a path computation element (PCE) configured to communicate with a path computation client (PCC) and compute a backup ingress node for a Point-to-Multipoint (P2MP) Label Switched Path (LSP) in a network associated with the PCC. The backup ingress node is coupled to an ingress node of the P2MP LSP and to a plurality of next-hop nodes of the ingress node of the P2MP LSP via a backup tree.

20 Claims, 11 Drawing Sheets

(56) References Cited

U.S. PATENT DOCUMENTS

| | | |
|---|---|---|
| 2003/0117952 A1 | 6/2003 | Ueno et al. |
| 2003/0123446 A1 | 7/2003 | Muirhead et al. |
| 2006/0159009 A1 | 7/2006 | Kim et al. |
| 2006/0268682 A1 | 11/2006 | Vasseur |
| 2007/0019558 A1 | 1/2007 | Vasseur et al. |
| 2007/0019954 A1 | 1/2007 | Lu et al. |
| 2007/0047556 A1 | 3/2007 | Raahemi et al. |
| 2007/0076720 A1 | 4/2007 | Wu |
| 2007/0091792 A1 | 4/2007 | Chandra et al. |
| 2007/0133406 A1 | 6/2007 | Vasseur |
| 2007/0165515 A1 | 7/2007 | Vasseur |
| 2007/0180105 A1 | 8/2007 | Filsfils et al. |
| 2007/0201355 A1 | 8/2007 | Vasseur et al. |
| 2007/0253326 A1 | 11/2007 | Saha et al. |
| 2007/0280102 A1 | 12/2007 | Vasseur et al. |
| 2008/0076720 A1 | 3/2008 | Xie et al. |
| 2008/0123521 A1 | 5/2008 | Vasseur et al. |
| 2008/0123524 A1* | 5/2008 | Vasseur et al. ............... 370/228 |
| 2008/0205282 A1 | 8/2008 | Huang |
| 2008/0219272 A1* | 9/2008 | Novello et al. ............... 370/401 |
| 2009/0219806 A1* | 9/2009 | Chen et al. .................. 370/219 |
| 2010/0008222 A1 | 1/2010 | Le Roux et al. |
| 2010/0039939 A1 | 2/2010 | Wang |
| 2010/0146149 A1 | 6/2010 | Vasseur et al. |
| 2010/0177631 A1 | 7/2010 | Chen et al. |
| 2010/0189115 A1 | 7/2010 | Kitada |
| 2010/0323000 A1 | 12/2010 | Ali et al. |
| 2011/0063972 A1* | 3/2011 | Muley et al. ................. 370/225 |
| 2012/0044801 A1 | 2/2012 | Vasseur et al. |

FOREIGN PATENT DOCUMENTS

| | | | |
|---|---|---|---|
| JP | 2007074308 | A | 3/2007 |
| JP | 2012500539 | A | 1/2012 |
| WO | 2008037917 | A1 | 4/2008 |
| WO | 2008043374 | A1 | 4/2008 |
| WO | 2008120267 | A1 | 10/2008 |
| WO | 2009054032 | A1 | 4/2009 |

OTHER PUBLICATIONS

Bradner, S., "Key words for use in RFCs to Indicate Requirement Levels", BCP 14, RFC 2119, Mar. 1997.
Awduche, D., Berger, L., Gan, D., Li, T., Srinivasan, V., and G. Swallow, "RSVP-TE: Extensions to RSVP for LSP Tunnels", RFC 3209, Dec. 2001.
Vasseur, JP. And JL. Le Roux, "Path Computation Element (PCE) Communication Protocol (PCEP)", RFC 5440, Mar. 2009.
Pan, P., Swallow, G., and A. Atlas, "Fast Reroute Extensions to RSVP-TE for LSP Tunnels", RFC 4090, May 2005.
Aggarwal, R., Papadimitriou, D., and S. Yasukawa,"Extensions to Resource Reservation Protocol—Traffic Engineering (RSVP-TE) for Point-to-Multipoint TE Label Switched Paths (LSPs)", RFC 4875, May 2007.
Zhao, Q., King, D., Verhaeghe, F., Takeda, T., Ali, Z., and J. Meuric, "Extensions to the Path Computation Element Communication Protocol (PCEP) for Point-to-Multipoint Traffic Engineering Label Switched Paths", RFC 6006, Sep. 2010.
Farrel, A., Vasseur, J., and J. Ash, "A Path Computation Element (PCE)-Based Architecture", RFC 4655, Aug. 2006.
Yasukawa, S. and A. Farrel, "Path Computation Clients (PCC)—Path Computation Element (PCE) Requirements for Point-to-Multipoint MPLS-TE", RFC 5862, Jun. 2010.
Zhao, (Ed.) et al., "Extensions to the Path Computation Element Communication Protocol (PCEP) for Point-to-Multipoint Traffic Engineering Label Switched Paths," draft-ietf-pce-pcep-p2mp-extensions-06.txt, Dec. 30, 2009.
Chen, "Extensions to the Path Computation Element Communication Protocol (PCEP) for Backup Ingress of a Traffic Engineering Label Switched Path," draft-chen-pce-compute-backup-ingress-00.txt; Oct. 18 2010.
Chen, "Extensions to the Path Computation Element Communication Protocol (PCEP) for Backup Ingress of a Traffic Engineering Label Switched Path," draft-chen-pce-compute-backup-ingress-01.txt; Mar. 12, 2011.
Foreign Communication From a Related Counterpart Application, PCT Application PCT/CN2011/071358, International Search Report dated Jun. 9, 2011, 3 pages.
Foreign Communication From a Related Counterpart Application, PCT Application PCT/CN2011/071358, Written Opinion dated Jun. 9, 2011, 3 pages.
Foreign Communication From a Related Counterpart Application, International Search Report and Written Opinion, PCT/CN2011/071358 dated Feb. 8, 2013, 8 pages.
Cao, et al. "Head Node Protection Extensions to RSVP-TE for LSP Tunnels," draft-cao-mpls-te-p2mp head protection-01.txt, Nov. 17, 2007, 18 pages.
Foreign Communication From a Counterpart Application, European Application No. 11746859.5, Extended European Search Report dated Feb. 8, 2013, 8 pages.
Cao, et al. "Head Node Protection Extensions to RSVP-TE for LSP Tunnels," draft-cao-mpls-te-p2mp-head-protection-01.txt, Nov. 17, 2007, 18 pages.
Foreign Communication From a Counterpart Application, European Application No. 13170910.7, Extended European Search Report dated Aug. 29, 2013, 9 pages.
Awduche, D., et al., "Requirements for Traffic Engineering Over MPLS," RFC 2702, Sep. 1999, 29 pages.
Berger, Ed., L, et al., "Generalized Multi-Protocol Label Switching (GMPLS) Signaling Resource Reservation Protocol-Traffic Engineering (RSVP-TE) Extensions," RFC 3473, Jan. 2003, 43 pages.
Braden, Ed., R., et al., "Resource Reservation Protocol (RSVP)—Version 1 Functional Specification," RFC 2205, Sep. 1997, 112 pages.
Chen, H., "Extensions to Path Computation Element Communication Protocol (PCEP) for Backup Ingress of a Traffic Engineering Label Switched Path," draft-chen-pce-compute-backup-ingress-05.txt, Feb. 25, 2013, 14 pages.
Le Roux, J.L., et al., "P2MP MPLS-TE Fast Reoute with P2MP Bypass Tunnels," draft-leroux-mpls-p2mp-te-bypass-01.txt, Mar. 2007, 12 pages.
Narten, T., "Assigning Experimental and Testing Numbers Considered Useful," RFC 3692, Jan. 2004, 8 pages.
Rosen, E., et al., "Multiprotocol Label Switching Architecture," RFC 3031, Jan. 2001, 57 pages.
Rosen, E., et al., "MPLS Label Stack Encoding," RFC 3032, Jan. 2001, 22 pages.
Yasukawa, Ed., S., "Signaling Requirements for Point-to-Multipoint Traffic-Engineered MPLS Label Switched Paths (LSPs)," RFC 4461, 30 pages.
Foreign Communication From a Counterpart Application, PCT Application PCT/US2010/020462, International Search Report dated Aug. 4, 2010, 7 pages.
Foreign Communication From a Counterpart Application, PCT Application PCT/US2010/020462, Written Opinion dated Aug. 4, 2010, 6 pages.
Foreign Communication From a Counterpart Application, Chinese Application No. 201080003837.1, Chinese Office Action dated Feb. 27, 2013, 5 pages.
Foreign Communication From a Counterpart Application, Chinese Application No. 201080003837.1, Partial English Translation of Chinese Office Action dated Feb. 27, 2013, 7 pages.
Foreign Communication From a Counterpart Application, European Application No. 10700352.7, European Office Action dated Jun. 10, 2011, 6 pages.
Foreign Communication From a Counterpart Application, European Application No. 10700352.7, European Office Action dated Mar. 9, 2012, 5 pages.
Foreign Communication From a Counterpart Application, European Application No. 10700352.7, European Office Action dated Aug. 29, 2012, 3 pages.
Foreign Communication From a Related Counterpart Application, Japanese Application No. 2011523222, Japanese Office Action dated Sep. 14, 2012, 3 pages.

(56) References Cited

OTHER PUBLICATIONS

Foreign Communication From a Related Counterpart Application, Japanese Application No. 2011523222, Partial Translation of Japanese Office Action dated Sep. 14, 2012, 2 pages.

Foreign Communication From a Counterpart Application, Japanese Application No. 2011-523222, Japanese Notice of Allowance dated Jan. 29, 2013, 3 pages.

Foreign Communication From a Counterpart Application, Japanese Application No. 2011-523222, Partial English Translation of Japanese Notice of Allowance dated Jan. 29, 2013, 1 page.

Office Action dated Jun. 15, 2012, 6 pages, U.S. Appl. No. 12/683,968, filed Jan. 7, 2010.

Office Action dated Aug. 1, 2012, 39 pages, U.S. Appl. No. 12/683,968, filed Jan. 7, 2010.

Office Action dated Feb. 13, 2013, 40 pages, U.S. Appl. No. 12/683,968, filed Jan. 7, 2010.

Foreign Communication From a Counterpart Application, Japanese Application No. 2012-554211, Japanese Office Action dated Dec. 3, 2013, 2 pages.

Foreign Communication From a Counterpart Application, Japanese Application No. 2012-554211, English Translation of Japanese Office Action dated Dec. 3, 2013, 2 pages.

Zhao, Q., Ed., et al., "Extensions to the Path Computation Element Communication Protocol (PCEP) for Point-to-Multipoint Traffic Engineering Label Switched Paths," draft-ietf-pce-pcep-p2mp-extensions-04.txt, Internet Draft, Aug. 18, 2009, 29 pages.

\* cited by examiner

SYSTEM AND METHOD FOR COMPUTING A BACKUP INGRESS OF A POINT-TO-MULTIPOINT LABEL SWITCHED PATH

CROSS-REFERENCE TO RELATED APPLICATIONS

The present application claims the benefit of U.S. Provisional Patent Application No. 61/308,835 filed Feb. 26, 2010 by Huaimo Chen and entitled "System and Method for Computing A Backup Ingress of A P2MP LSP," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In some networks, such as Multiprotocol Label Switching (MPLS) networks and Generalized MPLS (GMPLS) networks, a Traffic Engineering (TE) Label Switched Path (LSP) can be established using a Resource Reservation Protocol-TE (RSVP-TE) for a given path. A path can be provided by a Path Computation Client (PCC) and/or a Path Computation Element (PCE). For example, the PCC may request a path or route from the PCE, which computes the path and forwards the computed path information back to the PCC. The path can be a point-to-point (P2P) path, which comprises a plurality of nodes and/or Label Switch Routers (LSRs) and extends from a source node or LSR to a destination node or LSR. Alternatively, the path can be a Point-to-Multipoint (P2MP) path that extends from the source node to a plurality of destination nodes. The RSVP-TE can also be used to establish backup P2P and P2MP LSPs to reroute packets during network link or internal node failures and thus guarantee packet delivery.

SUMMARY

In one embodiment, the disclosure includes an apparatus. The apparatus includes a path computation element (PCE) configured to communicate with a path computation client (PCC) and compute a backup ingress node for a Point-to-Multipoint (P2MP) Label Switched Path (LSP) in a network associated with the PCC. The backup ingress node is coupled to an ingress node of the P2MP LSP and to a plurality of next-hop nodes of the ingress node of the P2MP LSP via a backup tree.

In another embodiment, the disclosure includes a network component. The network component includes a receiver, circuit logic, and a transmitter. The receiver is configured to receive a request message for computing a backup ingress node of a Point-to-Multipoint (P2MP) Label Switched Path (LSP) in a network. The circuit logic is configured to attempt computing a backup ingress node for the P2MP LSP based on the network's topology and a set of constraints in the request message. The transmitter is configured to send a reply message comprising the computed backup ingress node if the backup ingress node is computed successfully.

In a third aspect, the disclosure includes a method. The method includes exchanging capability information between a path computation element (PCE) and a path computation client (PCC) during a session establishment between the PCE and the PCC. The capability information are related to computing a backup ingress node for a Point-to-Multipoint (P2MP) Label Switched Path (LSP) in a network.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The Internet Engineering Task Force (IETF) request for comment (RFC) 4655 publication dated August 2006 entitled "A Path Computation Element-(PCE) Based Architecture", which is incorporated herein by reference, describes components for computing P2P TE LSPs across multiple areas or Autonomous System (AS) domains. The components may comprise a PCE, which may comprise or may be coupled to one or more path computation servers and traffic engineering databases (TEDs), and one or more PCCs coupled to the PCE. A PCC may send a P2P TE LSP computation request to the PCE, which may use a TED to compute a path and respond to the PCC with the computed path. The TED may be constructed using TE information that may be exchanged using a network routing protocol. The communications between the PCE and the PCC for P2P LSP path computations may be based on a PCE communication protocol (PCEP).

An IETF RFC 4875 publication dated May 2007 entitled "Extensions to Resource Reservation Protocol—Traffic Engineering (RSVP-TE) for Point-to-Multipoint TE Label Switched Paths (LSPs)", which is incorporated herein by reference, describes a mechanism for setting up P2MP TE LSPs. A P2MP LSP may comprise a plurality of Source-to-Leaf (S2L) sub LSPs that may be configured between an ingress node or LSR and a plurality of egress nodes or LSRs. The S2L sub LSPs may be appropriately combined to one another by a plurality of branch nodes or LSRs using a RSVP to obtain a P2MP TE LSP. Additionally, an IETF RFC 6006 publication dated September 2010 entitled "Extensions to the Path Computation Element Communication Protocol (PCEP) for Point-to-Multipoint Traffic Engineering Label Switched Paths", which is incorporated herein by reference, describes extensions to the PCEP for handling requests and responses for P2MP TE LSPs path computations.

However, the documents above do not include a mechanism to allow a PCC to send a request to a PCE for computing a backup ingress node for a P2MP LSP and to allow a PCE to compute the backup ingress node and reply to the PCC with a computation result for the backup ingress node. Disclosed herein is a system and method for computing a backup ingress node for a P2MP LSP, which may transport traffic across multiple areas or AS domains. The system and method may also allow the PCE and the PCC to exchange information related to the computed backup ingress node of the P2MP LSP.

Figure 1:
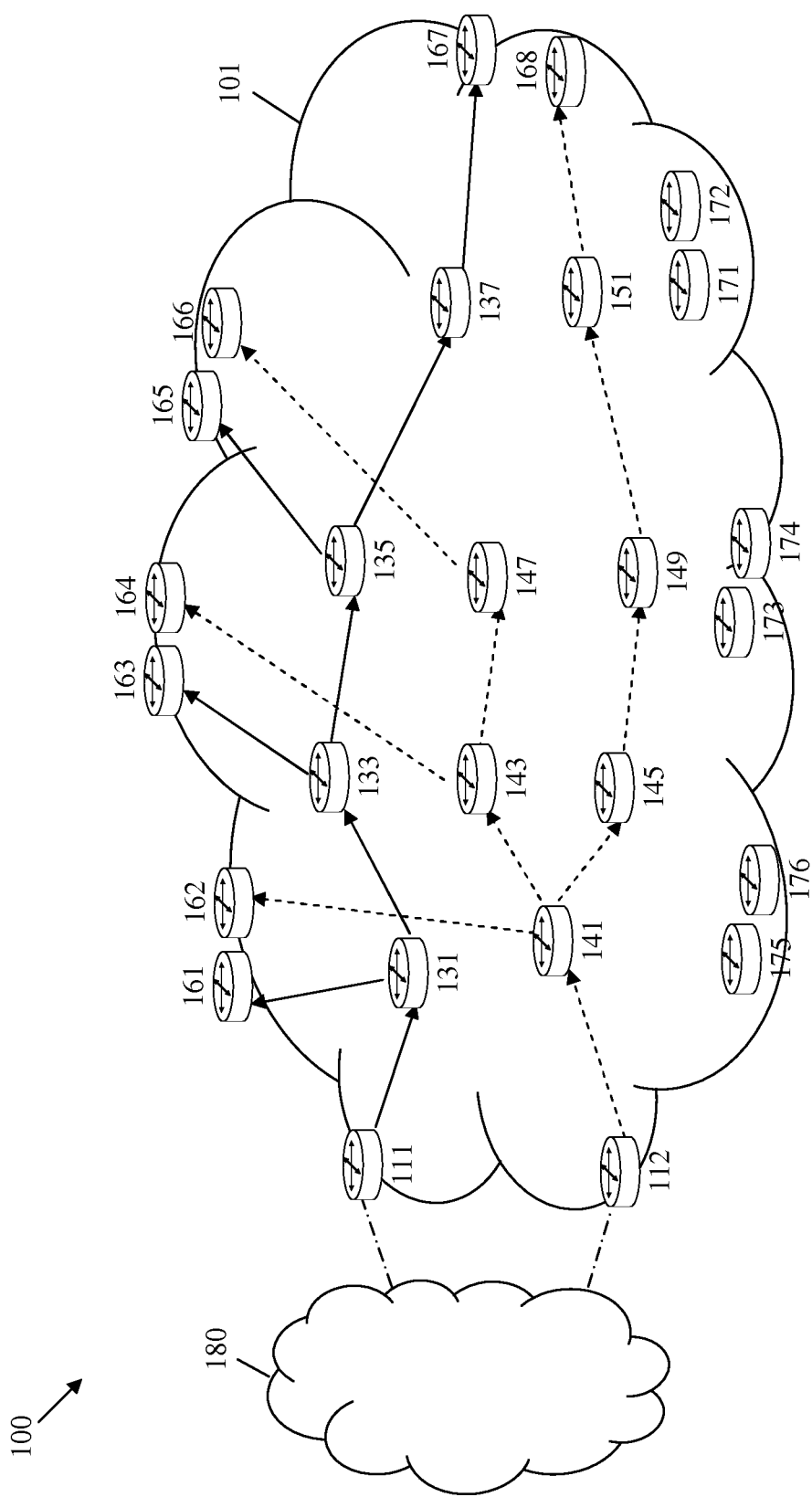
FIG. 1 is a schematic diagram of an embodiment of a label switched system.

FIG. 1 illustrates one embodiment of a label switched system 100, where a plurality P2MP LSPs may be established between at least some of the components. The P2MP LSPs may be used to transport data traffic. The label switched system 100 may comprise a label switched network 101, which may be a packet switched network that transports data traffic using packets or frames along network paths or routes. The packets may be routed or switched along the network paths, which may be established by a label switching protocol, such as MPLS or GMPLS.

The label switched network 101 may comprise a plurality of edge nodes, including a first ingress node 111, a second ingress node 112, a plurality of first egress nodes 161, 163, 165, 167, 171, 173 and 175, and a plurality of second egress nodes 162, 164, 166, 168, 172, 174 and 176. Additionally, the label switched network 101 may comprise a plurality of internal nodes 131, 133, 135, 137, 141, 143, 145, 147, 149 and 151, which may communicate with one another and with the edge nodes. The first ingress node 111 and the second ingress node 112 may also communicate with a first external network 180, such as an Internet protocol (IP) network, which may be coupled to the label switched network 101. As such, the first ingress node 111 and the second ingress node 112 may transport data, e.g., data packets, between the label switched network 101 and the external network 180. Further, some of the first egress nodes and second egress nodes may be grouped in pairs, such as the first egress node 161 and the second egress node 162, where each pair may be coupled to a second external network or a client (not shown).

In an embodiment, the edge nodes and internal nodes may be any devices or components that support transportation of the packets through the label switched network 101. For example, the edge nodes and internal nodes may include switches, routers, or various combinations of such devices. The edge nodes and internal nodes may receive packets from other network nodes, comprise logic circuitry that determines which network nodes to send the packets to, and transmit the packets to the other network nodes. In some embodiments, at least some of the internal nodes may be LSRs that may be configured to modify or update the labels of the packets transported in the label switched network 101. Further, at least some of the edge nodes may be label edge routers (LERs) that may be configured to insert or remove the labels of the packets transported between the label switched network 101 and the external network 180.

The label switched network 101 may also comprise a first P2MP LSP, which may be established to multicast data traffic from the first external network 180 to the second external networks or clients. The first P2MP LSP may comprise the first ingress node 111, which may be referred to as a root node, and the first egress nodes 161, 163, 165 and 167, which may be referred to as leaf nodes. The first P2MP LSP may also comprise the internal nodes 131, 133, 135, and 137. The first P2MP LSP is shown using solid arrow lines in FIG. 1. To protect the first P2MP LSP against link or node failures, the label switched network 101 may also comprise a second P2MP LSP. The second P2MP LSP may comprise the second ingress or root node 112, the second egress or leaf nodes 162, 164, 166 and 168, and the internal nodes 141, 143, 145, 147, 149, and 151. Each of the second egress nodes in the second P2MP LSP may be paired with a first egress node in the first P2MP LSP. The second P2MP LSP may also comprise the same and/or different internal nodes. The second P2MP LSP may provide a backup path to the first P2MP LSP and may be used to forward traffic from the first external network 180 to the second external networks or clients when the ingress node or any egress node in the first P2MP LSP fails. The second P2MP LSP is shown using dashed arrow lines in FIG. 1.

Reserving a second P2MP LSP as a backup path to the first P2MP LSP may be resource consuming since the second P2MP LSP may require additional network bandwidth, which may be comparable to the reserved bandwidth of the first P2MP LSP. Further, when the ingress node of the first P2MP LSP fails, rerouting traffic via a corresponding second P2MP LSP may cause a delay in traffic delivery. Even if the second P2MP LSP carries the same traffic as the first P2MP LSP, when the ingress node of the first P2MP LSP fails, there may be a substantial delay at a second external network or a client to determine the failure and switch to a second egress node for receiving the traffic. Such delay may not be acceptable in some systems, e.g., for real time services such as IP television (IPTV).

Figure 2:
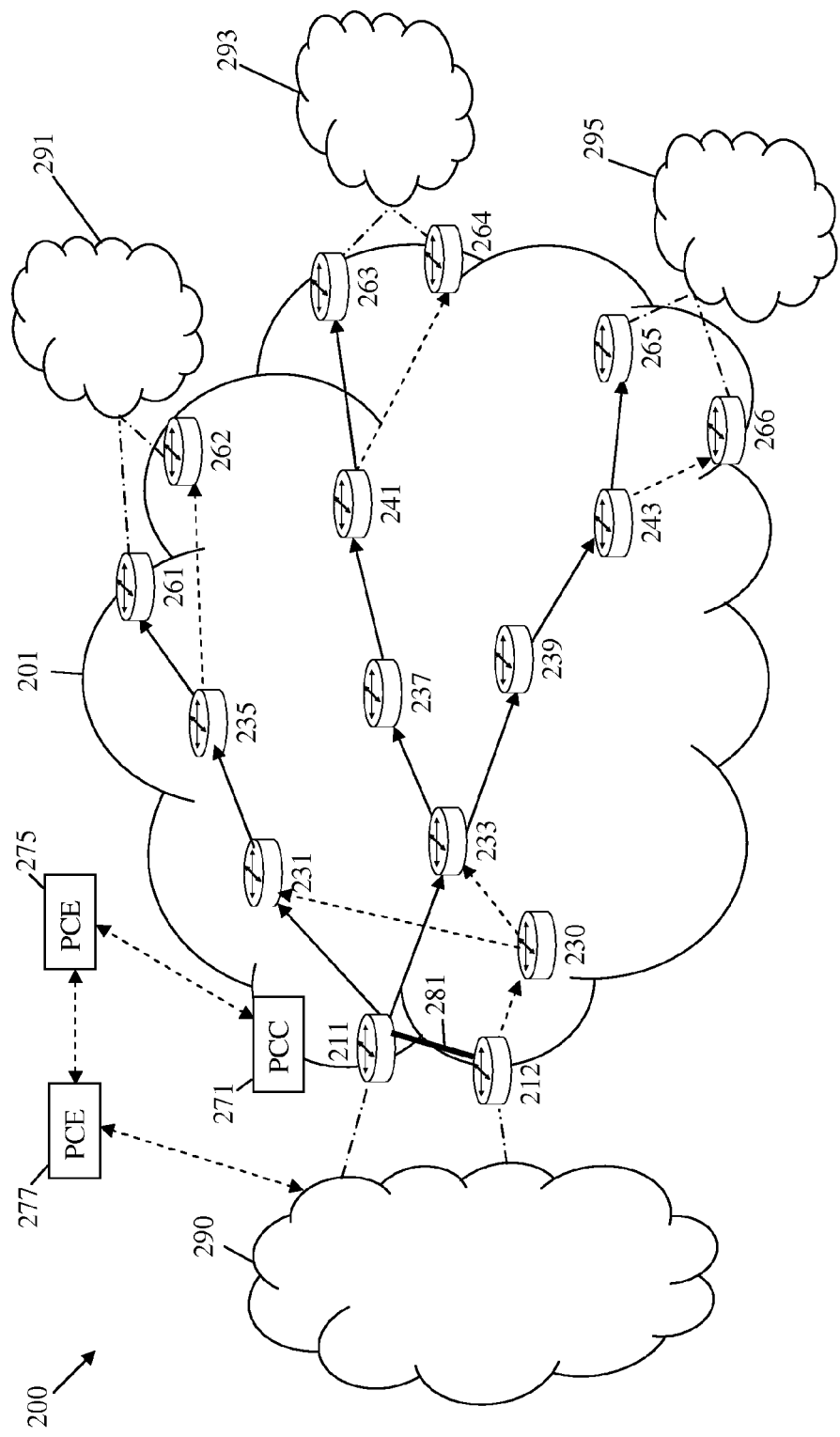
FIG. 2 is a schematic diagram of another embodiment of the label switched system.

FIG. 2 illustrates an embodiment of another label switched system 200, where a plurality of TE LSPs may be established between at least some of the components. The label switched system 200 may comprise a label switched network 201, which may be a packet switched network. The label switched network 201 may comprise a plurality of edge nodes, which may comprise a first ingress node 211, a second ingress node 212, a plurality of first egress nodes 261, 263, 265 and a plurality of second egress nodes 262, 264, 266. Additionally, the label switched network 201 may comprise a plurality of internal nodes 230, 231, 233, 235, 237, 239, 241 and 243, which may communicate with one another and with the edge nodes. The label switched network 201 may communicate with a first external network 290 via the first ingress node 211 and the second ingress node 212, and with a plurality of second external networks 291, 293 and 295 via the first egress nodes 261, 263, 265 and the second egress nodes 262, 264 and 266. Additionally, the label switched system 200 may comprise a PCC 271 at the label switched network 201 and a first PCE 275 coupled to the PCC 271 or the label switched network 201, and may also comprise a second PCE 277 coupled to the first PCE 275 and the first external network 290.

The label switch network 201 may communicate with each of the second external networks 291, 293, and 295 via a corresponding pair of egress nodes, such as the first egress node 261 and the second egress node 262. Additionally or alternatively, the pairs of egress nodes may communicate with corresponding clients. The label switched network 201 may comprise a P2MP LSP, which may be established to multicast data traffic from the first external network 290 to the second external networks 291, 293 and 295, or alternatively to clients coupled to the label switched network 201.

The P2MP LSP may comprise the first ingress node 211 and at least some of the first egress nodes. The P2MP LSP may also comprise a plurality of internal nodes. The second ingress node 212 may be designated as a backup node for the first ingress node 211, e.g., to protect the P2MP LSP against ingress node failure. Accordingly, the second ingress node 212 may be configured to communicate with the first ingress node 211 and establish a backup P2MP sub tree for protecting the first ingress node 211. As such, when the first ingress node 211 fails, the second ingress node 212 may route any packets that are to be sent to the first ingress node 211 and to be transported by the P2MP LSP via the backup P2MP sub tree, which may then merge the packets into the P2MP LSP. This P2MP LSP backup scheme may not require establishing a complete second backup P2MP LSP, and thus may need less resources/bandwidth and introduce less delays when the first ingress node fails in comparison to the P2MP LSP backup scheme of the label switched system 100.

Specifically, the second ingress node 212 may be selected or computed using the first PCE 275, e.g., based on network topology information. The PCC 271 may send a request for computing a backup ingress from the label switched network 201 to the first PCE 275, which may compute the second ingress node 212 as the backup ingress and send a reply to the PCC 271. The PCC 271 may be any entity or component located the label switched network 201 that forwards path computation requests to the first PCE 275. The PCC 271 may be located at or correspond to the ingress node 211 or may be any other node in the label switched network 201 that is coupled to the ingress node 211. The first PCE 275 may also communicate with the second PCE 277 to compute the backup ingress node. After receiving the request and computing the backup ingress node, the first PCE 275 may inform the first ingress node 211 of the selected second ingress node 212. The first ingress node 211 may then communicate with the second ingress node 212, e.g., by establishing a communication channel with the second ingress node 212.

The first ingress node 211 may send information about the P2MP LSP via the communication channel to the second ingress node 212. The information sent to the second ingress node 212 may comprise constrains on the P2MP LSP, an Explicit Route Object (ERO), a S2L sub LSP descriptor list, a Record Route Object (RRO), a S2L sub LSP flow descriptor list, or combinations thereof. The information may be sent in an Open Shortest Path First (OSPF) type 9 Link State Advertisement (LSA) including a TLV that comprises the information. Alternatively, the information may be sent in a RSVP-TE PATH message including a flag that indicates that the information in the message is for protecting the first ingress node 211.

The second ingress node 212 may receive this information from the first ingress node 211 and use the information to establish the backup P2MP sub tree. The second ingress node 212 may initiate a backup P2MP sub tree that comprises the second ingress node 212 and a plurality of next-hop nodes of the first ingress node 211 of the P2MP LSP. For instance, the backup sub tree may comprise the second ingress node 212 and the internal nodes 230, 231, and 233 (as indicated by the dashed arrow lines). The second ingress node 212 may be aware of the next-hop nodes from the RRO and the S2L sub LSP flow descriptor list that may be sent from the first ingress node 211. The backup P2MP sub tree may be created by computing a path from the second ingress node 212 to the next-hop nodes, sending a PATH message along the computed path, receiving a reservation (RESV) message in return, and creating a forwarding state (e.g. table) for the backup P2MP sub tree. The PATH and RESV messages may be similar to the PATH and RESV messages defined by IETF.

After configuring the second ingress node 212 as a backup node for the first ingress node 211, the second ingress node 212 may begin detecting any failure in the first ingress node 211 using a failure detection mechanism. For instance, the failure detection mechanism may be a Bi-directional Forwarding Detection (BFD) over an interface 281 or a P2P LSP that may be established between the first ingress node 211 and the second ingress node 212. When the second ingress node 212 detects a failure in the first ingress node 211, the second ingress node 212 may receive the traffic associated with the first ingress node 211, e.g., from the first external network 290, and then forward the traffic via the backup P2MP sub tree, which is merged into the P2MP LSP at the next-hop nodes of the first ingress node 211, to the next-hop nodes. In an embodiment, if the traffic is initially received by both the first ingress node 211 and the second ingress node 212, then the second ingress node 212 may also forward the traffic via the backup P2MP sub tree to the next-hop nodes of the first ingress node 211 upon detecting a failure in the first ingress node 211.

Additionally, at least some of the second egress nodes that may be paired with corresponding first egress nodes may be designated as backup nodes for the first egress nodes to protect against egress node failure, such as the second egress node 262 and the first ingress node 261. Accordingly, a previous-hop node that may precede a first egress node along the P2MP LSP may receive information about a second egress node that is paired with the first ingress node, establish a backup LSP for the first egress node, and route packets to be sent to the first egress node via the backup LSP to the second egress node when a failure in the first egress node is detected.

The second egress node may be selected or computed as a backup for a first egress node using the first PCE 275 or another PCE coupled to the label switched network 201 (not shown), for instance based on network topology information. The second egress node may be computed by sending a request to the PCE via a PCC associated with the first egress node (not shown). The PCE may then inform the first egress node of the selected second egress node. Additionally or alternatively, the PCE may inform the first ingress node 211 of the selected second egress node. The information about the second egress node may then be sent to the first egress node and/or the previous-hop node of the first egress node. The information about the second egress node may be sent to the previous-hop node in a message. For instance, when the first egress node 261 receives the information about the selected second egress node 262, the first egress node 261 may send the information to the internal node 235, e.g., in a RESV message.

The first egress node may send the information about forwarding the data received from the P2MP LSP to a second external network or client to the second egress node in an OSPF type 9 LSA including a TLV that comprises the information. The second egress node may create a forwarding entry according to the information received for forwarding the data to the client. Alternatively, the first egress node may send the second egress node the information about forwarding the data received from the P2MP LSP to the second external network or client via the previous-hop node of the egress node in a RSVP-TE RESV message. The previous-hop node may then send the information in a RSVP-TE PATH message to the second egress node. If the first ingress node obtains the information about the selected second egress node, then the first ingress node may send that information to the previous-hop node, e.g., in a PATH message.

After receiving the message or information, the previous-hop node may establish a backup LSP from the previous-hop node to the second egress node (indicated by a dashed arrow line). The backup LSP may be created by computing a path from the previous-hop node to the second egress node, sending the PATH message along the computed path, receiving a RESV message in return, and creating a forwarding state (e.g., table) for the backup LSP. The backup LSP may be a P2P bypass tunnel or a P2P detour tunnel. When the previous-hop node detects a failure in the first egress node, the previous-hop node may forward the traffic, via the backup LSP, to the second egress node instead of the first egress node. The second egress node may then deliver the traffic to its destination, e.g., to the second external network or a client.

Selecting a backup ingress node for the first ingress node 211 and backup egress nodes for the first egress nodes may provide end-to-end protection in a P2MP LSP. By using the backup ingress and egress nodes, the end-to-end P2MP LSP protection may be localized to the initially configured (or primary) ingress and egress nodes of the P2MP LSP. This localized protection may provide more efficient protection to the edge nodes in comparison to using a second backup P2MP LSP from a second ingress node to all second egress nodes when an ingress or egress node fails. For instance, creating a backup P2MP sub tree from the backup ingress to the next-hop nodes of the first ingress node of the P2MP LSP and backup LSPs from the previous-hop nodes of the first egress nodes to the second backup egress nodes may require fewer network resources, e.g., in terms of reserved bandwidth, than creating a second backup P2MP LSP from the second ingress node to all the second egress nodes. Additionally, routing the traffic locally via the backup nodes and backup P2MP sub tree or LSPs, in the case of node failure, may be faster and simpler to implement than routing traffic along a second backup P2MP LSP.

In an embodiment, the PCC 271, the first PCE 275, and/or the second PCE 277 may declare capabilities related to computing a backup ingress node for a P2MP LSP during an establishment session, e.g., between the PCC 271 and the first PCE 275. For instance, the PCC 271 may send to the first PCE 275 a first session establishment message, which may comprise at least one flag that may be set to indicate supporting functions related to computing a backup ingress node for a P2MP LSP. The first PCE 275 may then send to the PCC 271 a second session establishment message, which may comprise at least one flag that may be set to indicate supporting related functions, such as the computation of a backup ingress for a P2MP LSP. The second session establishment message may comprise a TLV, which may comprise a value that indicates the capabilities of the first PCE 275. Alternatively, the second session establishment message may comprise an open object as described in the PCE Discovery protocol, which may comprise the TLV. As such, the PCC 271 may communicate with a plurality of PCEs, such as both the first PCE 271 and the second PCE 275 to obtain information about their different capabilities. The first PCE 271 may also communicate with the second PCE 275 to exchange their capability information. The PCC 271 may then request a specific function from the PCEs that may support that function, such as requesting a backup ingress node of a P2MP LSP.

In an embodiment, the PCC 271 may send a request message to the first PCE 275 to compute a backup ingress node for a P2MP LSP, e.g., after exchanging capability information with the first PCE 275. The request message may comprise a first flag, which may be set to request computing a backup ingress node of the P2MP LSP. The request message may also comprise a second flag, which may be used to indicate whether the path for the P2MP LSP is represented in a compressed format. In some embodiments, the request message may comprise a request/reply (RP) object, which may comprise the first flag and the second flag, as described in detail below.

The request message may also comprise information that may be used for computing the backup ingress node of the P2MP LSP. For example, the request message may comprise a path that the P2MP LSP traverses. Additionally, the request message may comprise path constraints, such as bandwidth limitation, and information about an external node (e.g., in the first external network 290) from which data traffic is delivered to the ingress node of the P2MP LSP and hence transported to the egress nodes via the P2MP LSP. In some embodiments, the PCC may send a plurality of request messages to a plurality of PCEs to obtain at least one backup ingress node for a designated P2MP LSP.

In an embodiment, the request message sent from the PCC 271 to the first PCE 275 for computing a backup ingress node of a P2MP LSP may comprise an identifier of a path for the P2MP LSP, which may also be stored at the first PCE 275. As such, the first PCE 275 may obtain information about the path for the P2MP LSP, e.g., from a local table or database, using the identifier of the path to compute a backup ingress node for the P2MP LSP. In some embodiments, the request message may also comprise a constraint indicating that the backup ingress node to be computed may not be a node on the P2MP LSP. Additionally, the request message may comprise a list of nodes, which may each be a candidate for the backup ingress node. Additionally or alternatively, the request message may comprise a constraint indicating that there must be a path from the computed backup ingress node to the next-hop nodes of the ingress node of the P2MP LSP and any internal node on the path from the backup ingress to the next-hop nodes may not be part of the P2MP LSP. In an embodiment, the request message may comprise a constraint indicating that there must be a path from the computed backup ingress node to the ingress node of the P2MP LSP and that the length of the path may be within a given hop limit, such as one hop.

In some embodiments, the path information provided to the first PCE 275 may not fit in a single request message. As such, a plurality of request messages may be sent to the first PCE 275. The information in all the forwarded request messages may be combined at the first PCE 275 to compute the backup ingress node for the P2MP LSP. To associate the multiple request messages with a single backup ingress node request, the request messages may comprise the same request identifier.

The first PCE 275 may send a reply message to the PCC 271 in return to the request message for computing a backup ingress node. The reply message may comprise information about the computed backup ingress node. Additionally, the reply message may comprise a path from the computed backup ingress node to a plurality of next-hop nodes of the ingress node of the P2MP LSP. In some embodiments, the first PCE 275 may not complete the backup ingress computation as requested, for example based on a set of constraints. As such, the first PCE 275 may send a reply message to the PCC 271 that indicates an unsuccessful backup ingress computation attempt. The reply message may comprise a PCEP error object, which may comprise an error type, error value, and some error details, as described below.

Figure 3:
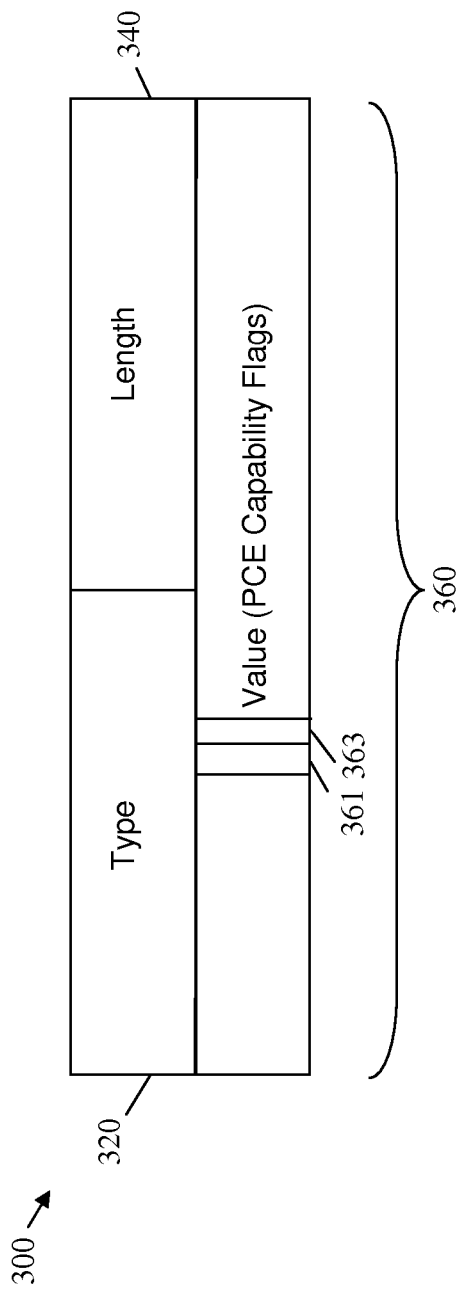
FIG. 3 is a diagram of a format of a PCE capability sub Type-Length-Value (TLV).

FIG. 3 illustrates one embodiment of a PCE capability sub TLV 300, which may be a sub TLV in a PCE Discovery (PCED) TLV. The PCE capability sub TLV 300 may be used in Interior Gateway Protocol (IGP) PCE discovery to describe the capability of a PCE. The PCE capability sub TLV 300 may be sent by a PCE (e.g., the first PCE 275) to advertise its capability to a PCC or a network. The PCE capability sub TLV 300 may comprise a type field 320, a length field 340, and a value field 360.

The value of the type field 320 may be set to about five or may be assigned by the Internet Assigned Numbers Authority (IANA) to indicate the type of the PCE capability sub TLV 300. The length field 340 may indicate the size of the value field 360, e.g., in bytes, such as about eight bytes. The value field 360 may comprise a sequence of capability flags, including a first flag 361 and a second flag 363. The first flag 361 in the value field 360 may be set, e.g., to about one, to indicate that the PCE is capable of computing a backup ingress for a P2MP LSP. The first flag 361 may be bit 10 in the sequence of bits of the value field 360 or any other bit assigned by IANA. The second flag 363 may be set, e.g., to about one, to indicate that the PCE is capable of computing a backup ingress for a P2P LSP. The second flag 363 may be bit 11 in the sequence of bits of the value field 360 or any other bit assigned by IANA.

Figure 4:
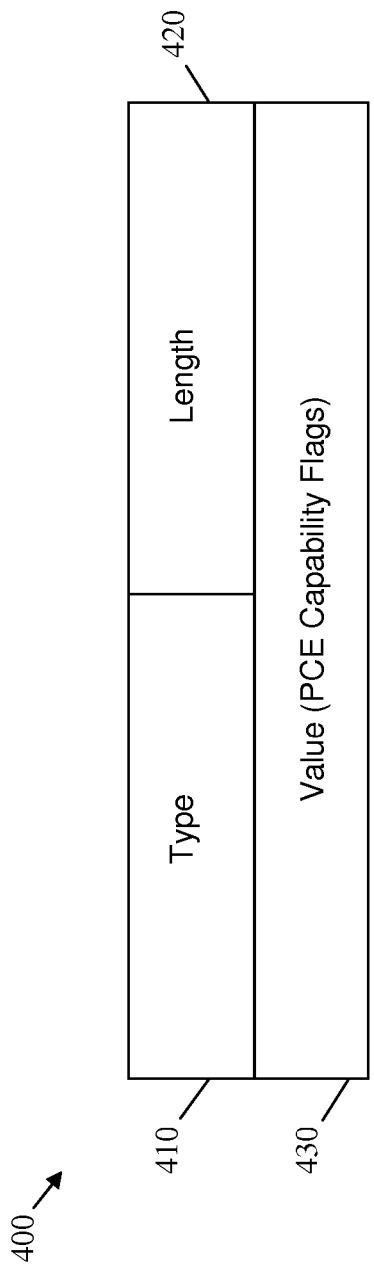
FIG. 4 is a diagram of a format of a PCE capability TLV.

FIG. 4 illustrates one embodiment of a PCE capability TLV 400 for backup ingress computation. The PCE capability TLV 400 may be an optional TLV in an OPEN object message that may exchanged during a PCE session establishment, e.g., between the first PCE 275 and the PCC 271. The PCE capability TLV 400 may comprise a type field 410, a length field 420, and a value field 430. The value of the type field 410 may be set to about one or may be assigned by IANA to indicate the type of the PCE capability TLV 400. The length field 420 may indicate the size of the value field 430, e.g., in bytes. The value field 430 may comprise a sequence of capability flags for the PCE. The flags in the value field 430 may be configured and set similar to the flags in the value field 360 of the PCE capability sub TLV 300.

In an embodiment, if a PCE does not advertise its capability of computing a backup ingress for a P2MP LSP during discovery, a PCC may discover which PCEs are capable of supporting the backup ingress computation for a P2MP LSP using an extended OPEN object, which may comprise the PCE capability TLV 400 in an optional field or TLV. The PCE capability TLV 400 may allow the PCE to advertise its capability of computing the backup ingress for a P2MP LSP.

Figure 5:
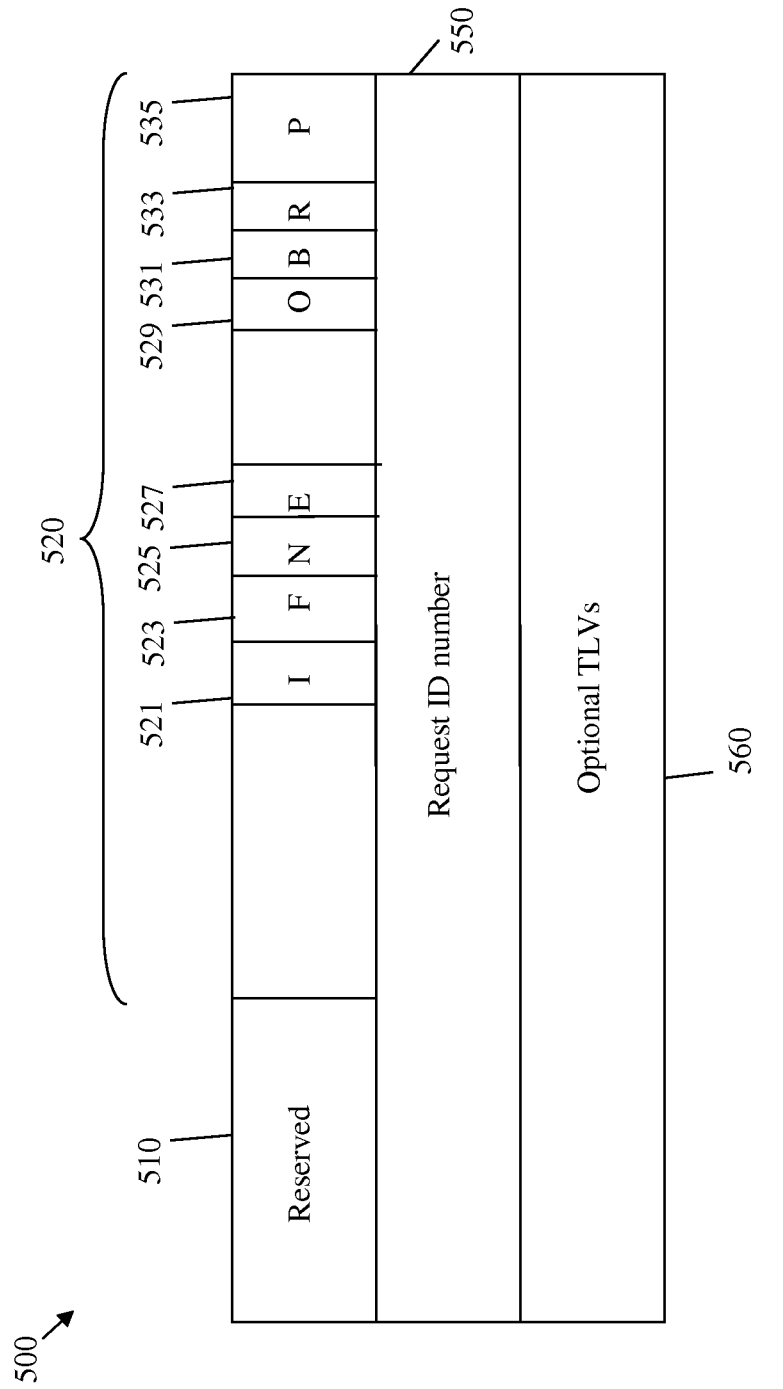
FIG. 5 is an illustration of one embodiment of a request/reply object.

FIG. 5 illustrates one embodiment of a RP object 500, which may be part of a request message transmitted from a PCC to a PCE or a part of a reply message transmitted from a PCE to a PCC. For instance, the RP object may indicate a backup ingress of a P2MP LSP related request message. The RP object 500 may comprise a reserved field 510, a flags field 520, and a request identification (ID) number 550. The flags field comprises flag 521, 523, 525, 527, 529, 531, 533, and 535. Additionally, the RP object 500 may optionally comprise one or more optional TLVs 560. The reserved field 510 may be reserved or may not be used. The reserved field 510 may have a length of about eight bits. The flags field 520 may comprise a backup ingress bit (I) flag 521, a fragmentation bit (F) flag 523, a P2MP bit (N) flag 525, an ERO compression bit (E) flag 527, a strict/loose bit (O) flag 529, a bi-directional bit (B) flag 531, a re-optimization (R) flag 533, and a plurality of priority bit (P) flags 535. The flags 520 may also comprise additional bits, which may be unassigned or reserved. For instance, the remaining bits in the flags field 520 may be set to about zero and ignored. The I flag 521 may be set, e.g., to about one, to indicate a backup ingress computation for a P2MP LSP. The I flag 521 may be set to indicate whether a request message or reply message is related to a backup ingress computation for a P2MP LSP.

The O flag 529 may be set, e.g., to about one, in a request message to indicate that a loose path is acceptable or may be cleared to indicate that a path comprising exclusively strict hops is required. The path may extend from a backup ingress node of a P2MP LSP to a plurality of next-hop nodes of the ingress node. The O flag 529 may be set, e.g., to about one, in a reply message to indicate that the computed path is loose or may be cleared to indicate that the computed path comprises strict hops. The P flags 535 may be used to specify a recommended request priority. For instance, the P flags 535 may have a value from about one to about seven, which may be set locally at the PCC. Alternatively, the P flags 535 may be set to about zeros when the request priority is not specified. The Request-ID-number 550 may be combined with a source IP address of the PCC or a PCE network address to identify the backup ingress computation request context. The Request ID number 550 may be changed or incremented each time a new request is sent to the PCE. The request ID number 550 may have a length of about 32 bits. The optional TLV(s) 560 may indicate path computation capabilities, path constraints, and/or other path information. The remaining flags or fields in the R/P object 500 may be configured based on the PCEP.

Figure 6:
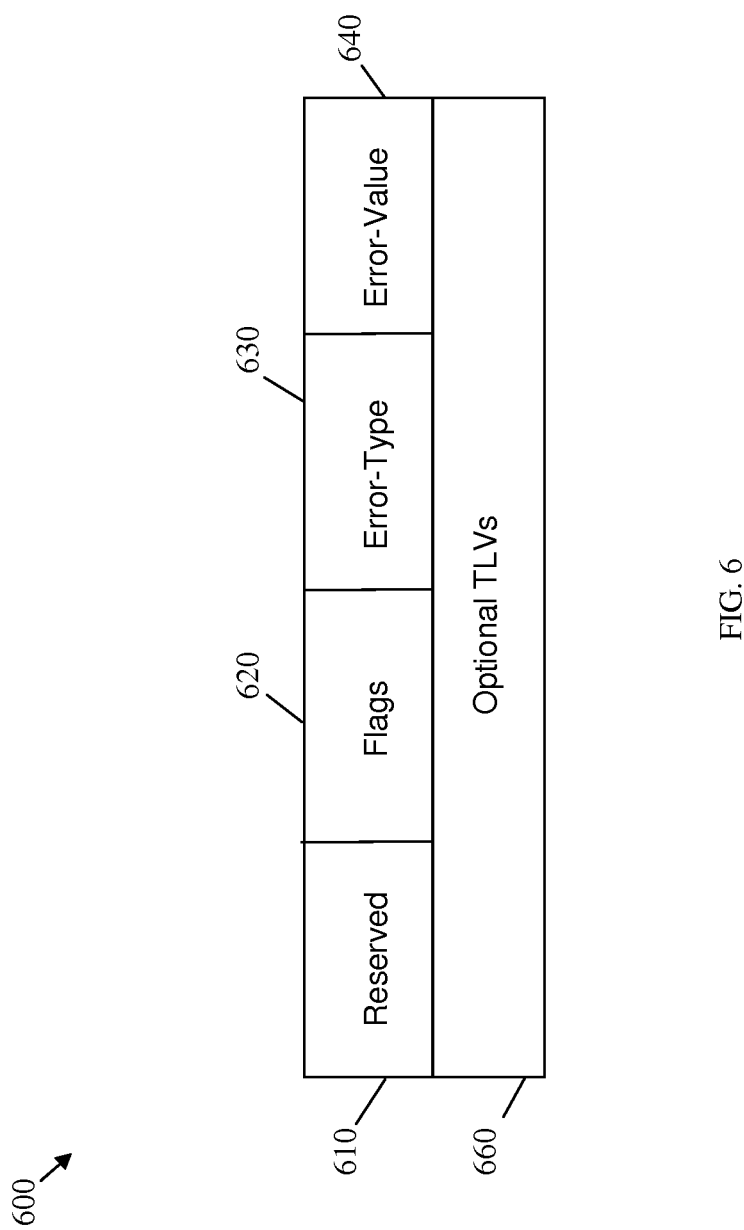
FIG. 6 is an illustration of one embodiment of a PCEP error object.

FIG. 6 illustrates one embodiment of a PCEP Error object 600 that may be used to indicate an error related to a backup ingress computation. The PCEP error object 600 may comprise a reserved field 610, a flags field 620, an error-type field 630, an error-value field 640, and one or more optional TLVs 660. The reserved field 610 may be reserved or may not be used. The flags field 620 may comprise a plurality of bit flags that may be similar to the bit flags described above. The error-type field 630 may be set to about 17 or may be assigned by IANA to indicate the type of the PCEP Error. The error-value field 640 may comprise one of multiple values that indicate errors associated with a backup ingress computation request.

If a PCE receives a backup ingress computation request and the PCE is not capable of satisfying the request, e.g., due to insufficient memory, the PCE may return a PCE error (PCErr) message that comprises the PCEP Error object 600 including an error type value of about 17 and an error value of about one. The corresponding backup ingress computation request may then be cancelled. Alternatively, if the PCE is not capable of computing a backup ingress, the PCE may return a PCErr message that comprises the PCEP error object 600 including an error type value of about 17 and an error value of about two. The corresponding backup ingress computation request may then be cancelled.

Alternatively, a plurality of error values may be defined under an existing error type value, e.g., of about two, that indicates that a capability is not supported. The defined errors value may indicate errors associated with a backup ingress computation request. In one embodiment, an error value of about three may be used with an existing error type value of about two in the PCEP Error object 600. The error value of about three may indicate that the PCE received a backup ingress computation request and is not capable of computing the backup ingress. Alternatively, an error value of about four may be used with the existing error type value of about two to indicate that the PCE received a backup ingress computation request and is not able to satisfy the request due to some reason, such as insufficient memory. In some embodiments, an error value may be defined under an existing error type value, e.g., of about five, that indicates a policy violation. The defined error value may indicate an error associated with a backup ingress computation policy violation. For instance, an error value of about six may be used with an existing error type value of about five in the PCEP Error object 600 to indicate that the PCE received a backup ingress computation request that is not compliant with administrative privileges (e.g., "The PCE policy does not support backup ingress computation").

Figure 7:
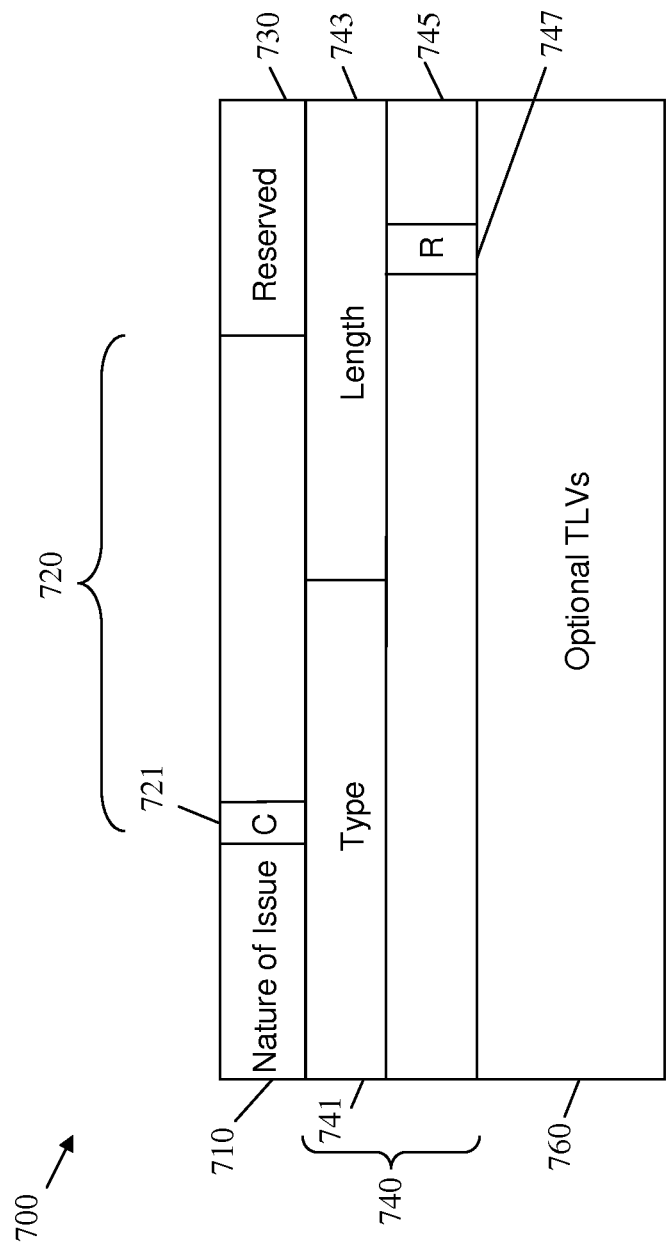
FIG. 7 is an illustration of one embodiment of a NO-PATH object.

FIG. 7 illustrates one embodiment of a NO-PATH object 700 for a backup ingress computation. The NO-PATH object 700 may be used in a Path Computation Reply (PCRep) message by a PCE to communicate with a PCC the reasons for not being able to find a backup ingress in response to a backup ingress computation request from the PCC. The NO-PATH object 700 may comprise a nature of issue field 710, a flags field 720, a reserved field 730, a first optional TLV 740, and one or more second optional TLVs 760. The nature of issue field 710 may comprise a value that indicates a reason of failure to compute a backup ingress node. The flags field 720 may comprise a sequence of flag bits, including a capability (C) flag 721 that indicates a capability object or TLV. The reserved field 730 may be reserved or may not be used.

The first optional TLV 740 may comprise a type field 741, a length field 743, and a second flags field 745. The type field 741 and the length field 743 may be configured similar to the type field 320 and the length field 340, respectively. The second flags field 745 may comprise a sequence of bit flags including a reachability (R) flag 747. The PCE may set the R flag 747 to indicate that there is a reachability issue with all or a subset of the next-hops of the ingress node of a P2MP LSP from a candidate backup ingress node. In this case, a plurality of unreachable IP version four (IPv4) or IP version six (IPv6) next-hops TLVs may be included into the NO-PATH object 700, which may each list one or more IP addresses of the next-hops of the ingress node of the P2MP LSP that may be unreachable from a candidate backup ingress node. The second optional TLV(s) 760 may be configured similar to the optional TLV(s) 560.

Figure 8:
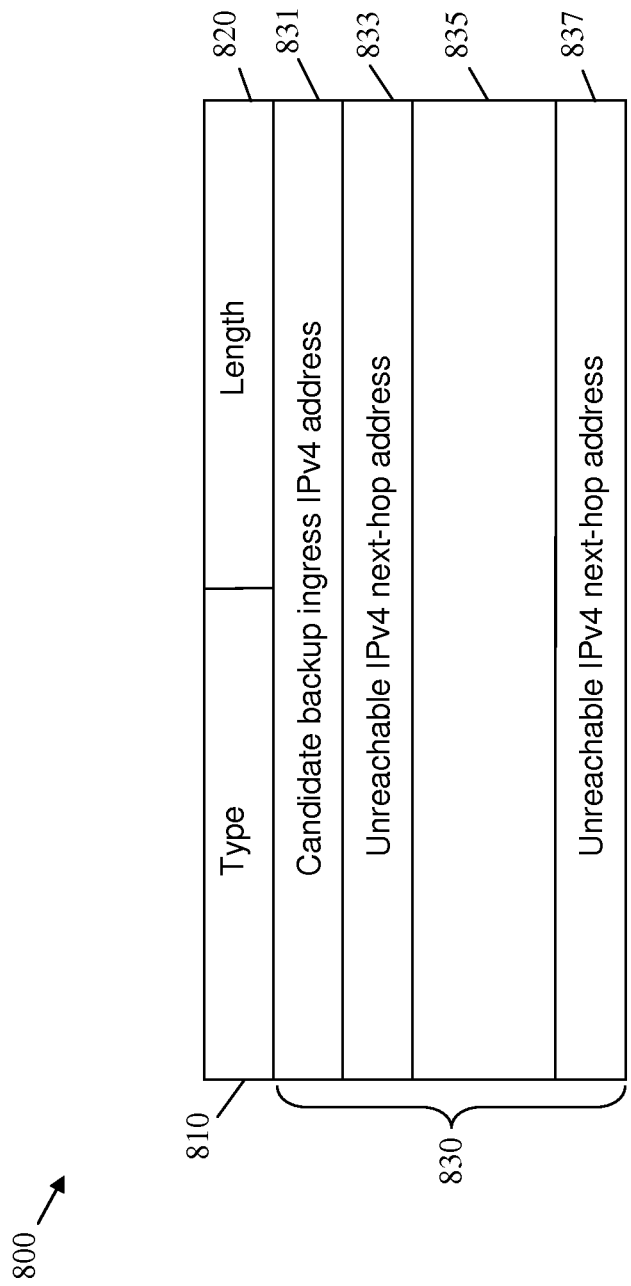
FIG. 8 is an illustration of one embodiment of an unreachable IPv4 next-hops TLV.

FIG. 8 is illustrates one embodiment of an unreachable IPv4 next-hops TLV 800 that may be part of the NO-PATH object 700. The unreachable IPv4 next-hops TLV 800 may comprise a type field 810, a length field 820, and a value field 830. The value of the type field 810 may indicate the type of the unreachable IPv4 next-hops TLV 800. For instance, the value of the type field 810 may be equal to about two or may be assigned by IANA. The length field 820 may indicate the size of the value field 830, e.g., in bytes. The value field 830 may comprise a candidate backup ingress IPv4 address field 831 and a list of unreachable IPv4 next-hop address fields 833, 835, and 837. The candidate backup ingress IPv4 address field 831 may identify a backup ingress node that does not reach to any of the next-hop nodes identified by the unreachable IPv4 next-hop address fields 833, 835, and 837. Reaching a next-hop node from the backup ingress node may not be possible if the PCE cannot find a path satisfying the set of constraints from the backup ingress node to a next-hop node. Specifically, the candidate backup ingress IPv4 address 831 and the unreachable IPv4 next-hop address fields 833, 835, and 837 may comprise IPv4 network addresses.

Figure 9:
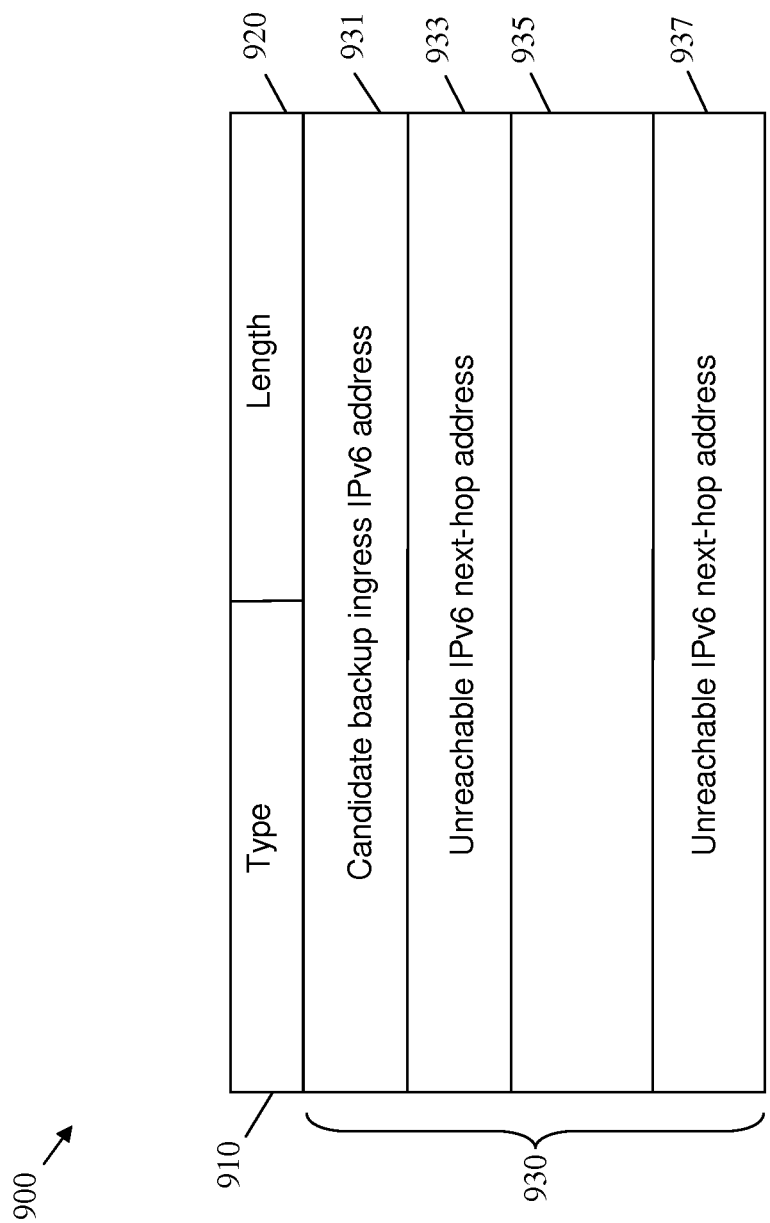
FIG. 9 is an illustration of one embodiment of an unreachable IPv6 next-hops TLV.

FIG. 9 illustrates one embodiment of an unreachable IPv6 next-hops TLV 900 that may be part of the NO-PATH object 700. The unreachable IPv6 next-hops TLV 900 may comprise a type field 910, a length field 920, and a value field 930. The value field 930 may comprise a candidate backup ingress IPv6 address field 931 and a list of unreachable IPv6 next-hop address fields 933, 935, and 937. The type field 910, length field 920, candidate backup ingress IPv6 address field 931, and unreachable IPv6 next-hop address fields 933, 935, and 937 may be configured similar to the type field 810, length field 820, candidate backup ingress IPv4 address field 941, and unreachable IPv4 next-hop address fields 833, 835, and 837, respectively. However, the candidate backup ingress IPv6 address field 931 and the unreachable IPv6 next-hop address fields 933, 935, and 937 may comprise IPv6 network addresses.

Figure 10:
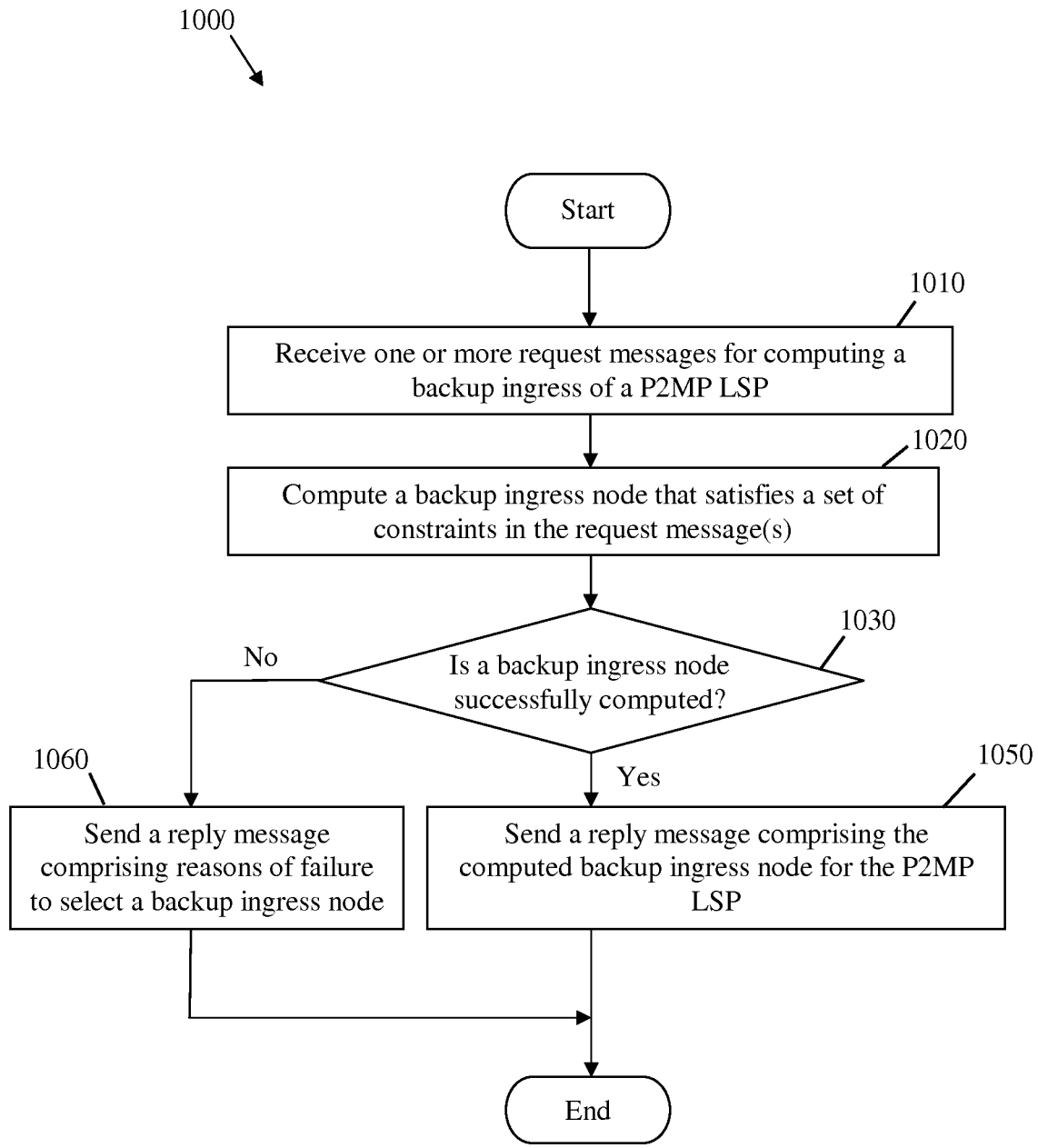
FIG. 10 is an illustration of one embodiment of a backup ingress computation method.

FIG. 10 illustrates one embodiment of a backup ingress computation method 1000, which may be implemented at the PCE to compute a backup ingress node for a P2MP LSP. The selected backup ingress node may satisfy a set of constraints received in a request message from a PCC. The method 1000 may begin at block 1010, where one or more request messages for computing a backup ingress of a P2MP LSP may be received. The request message may be sent from a PCC and comprise information about the P2MP LSP and a set of constraints about the backup ingress. For instance, the one or more request messages may comprise the PCE capability TLV 400 or the R/P object 500.

At block 1020, a backup ingress node that satisfies the set of constraints in the request message(s) may be computed. At block 1030, the method 1000 may determine whether a backup ingress node is successfully computed. If a backup ingress node that satisfies the constraints in the request message is computed or selected, then the method 1000 may proceed to block 1050. Otherwise, the method 1000 may proceed to block 1060. At block 1050, a reply message comprising the computed backup ingress node for the P2MP LSP may be sent. For instance, the selected ingress node may be sent in a reply message to the PCC. The method 1000 may then end. At block 1060, a reply message comprising reasons of failure to select a backup ingress node may be sent. For instance, the reasons of failure to select a backup ingress node may be sent in the PCEP error object 600 or the NO-PATH object 700 to the PCC. The method 1000 may then end.

Figure 11:
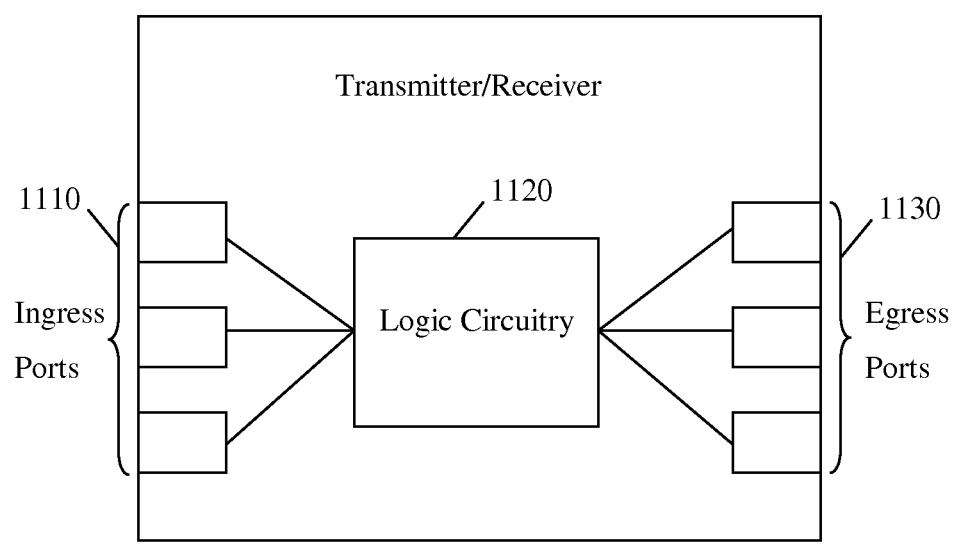
FIG. 11 is a schematic diagram of an embodiment of a transmitter/receiver unit.

FIG. 11 illustrates an embodiment of a transmitter/receiver unit 1100, which may be any device that transports packets through a network. For instance, the transmitter/receiver unit 1100 may be located in any of the network components described above. The transmitted/receiver unit 1100 may comprise one or more ingress ports or units 1110 for receiving packets, objects, or TLVs from other network components, logic circuitry 1120 to determine which network components to send the packets to, and one or more egress ports or units 1130 for transmitting frames to the other network components. The logic circuitry 1120 may also determine the proper data rates to transmit the packets via the downstream or egress links.

Figure 12:
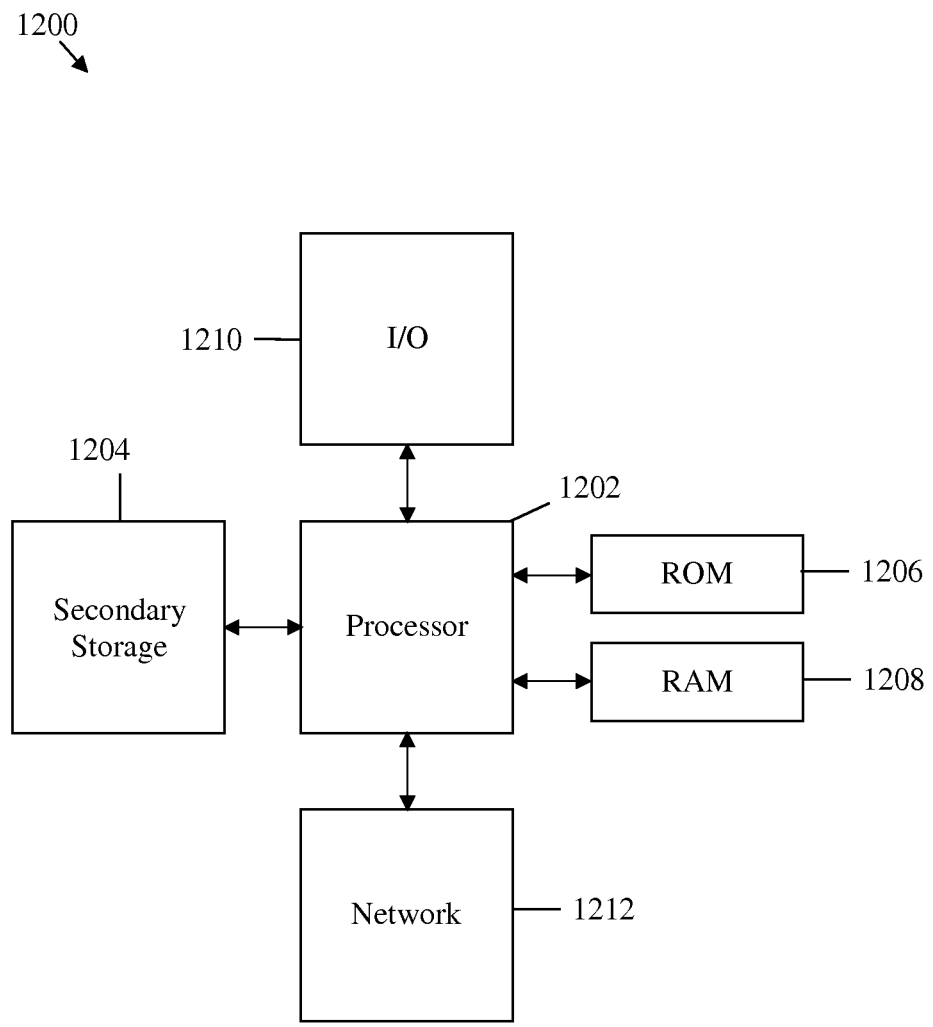
FIG. 12 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 12 illustrates a typical, general-purpose network component 1200 suitable for implementing one or more embodiments of the components disclosed herein. The network component 1200 includes a processor 1202 (which may be referred to as a central processor unit or CPU) that is in communication with memory devices including second storage 1204, read only memory (ROM) 1206, random access memory (RAM) 1208, input/output (I/O) devices 1210, and network connectivity devices 1212. The processor 1202 may be implemented as one or more CPU chips, or may be part of one or more application specific integrated circuits (ASICs).

The second storage 1204 is typically comprised of one or more disk drives or tape drives and is used for non-volatile storage of data and as an over-flow data storage device if RAM 1208 is not large enough to hold all working data. Second storage 1204 may be used to store programs that are loaded into RAM 1208 when such programs are selected for execution. The ROM 1206 is used to store instructions and perhaps data that are read during program execution. ROM 1206 is a non-volatile memory device that typically has a small memory capacity relative to the larger memory capacity of second storage 1204. The RAM 1208 is used to store volatile data and perhaps to store instructions. Access to both ROM 1206 and RAM 1208 is typically faster than to second storage 1204.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a path computation element (PCE) configured to:
receive a request message from a path computation client (PCC) that requests to compute a backup ingress node for an ingress node associated with a Point-to-Multipoint (P2MP) Label Switched Path (LSP);
compute the backup ingress node for the ingress node associated with the P2MP LSP using information within the request; and
transmit a reply message that indicates the backup ingress node has been computed,
wherein the backup ingress node is coupled to the ingress node of the P2MP LSP and to a plurality of next-hop nodes from the ingress node along the P2MP LSP,
wherein the request message comprises a plurality of constraints and a plurality of flags, and
wherein one of the flags is a backup ingress bit flag.

2. The apparatus of claim 1, wherein the backup ingress node and the ingress node are both coupled to an external node, wherein the backup node is configured to transport data received from the external node via a backup sub tree when the ingress node fails, wherein the backup sub tree merges with the P2MP LSP on at least one of the next hop-nodes, and wherein the sub tree does not extend across a network.

3. The apparatus of claim 1, wherein the PCE is further configured to obtain a list of candidate backup ingress nodes, wherein each of the candidate backup ingress nodes satisfies the plurality of constraints from an external node to one of the candidate backup ingress nodes, and wherein the PCE is not located along the P2MP LSP.

4. The apparatus of claim 3, wherein the one of the candidate backup ingress nodes is a node in the same network as the ingress node of the P2MP LSP.

5. The apparatus of claim 3, wherein the constraints comprise a hop limit, bandwidth and metric constraints on the path from the external node to the one of the backup ingress node.

6. The apparatus of claim 3, wherein the PCE is configured to receive the list of the candidate backup ingress nodes from a second PCE and select the backup ingress node from the list that satisfies the plurality of constraints.

7. The apparatus of claim 3, wherein the plurality of constraints comprise exclusive constraints, a hop limit, and bandwidth and metric constraints for a backup sub tree that has end points that extend from the backup ingress node to the next-hop nodes of the ingress node of the P2MP LSP.

8. The apparatus of claim 3, wherein one of the plurality of constraints is a hop limit constraint for the path between the backup ingress node and the ingress node of the P2MP LSP.

9. The apparatus of claim 1, wherein the reply message comprises the backup ingress node and a backup sub tree path, wherein the backup sub tree path extends from the backup ingress node to at least one of the next-hop nodes of the ingress node of the P2MP LSP.

10. The apparatus of claim 1, wherein the PCE is configured to exchange a capability information that indicates supporting one or more functions related to computing the backup ingress node for the ingress node associated with the P2MP LSP, and wherein the capability information is exchanged using a plurality of session establishment messages.

11. A network component comprising:
a receiver configured to receive a request message from a path computation client (PCC) to select a backup ingress node for a Point-to-Multipoint (P2MP) Label Switched Path (LSP) in a network to protect an ingress node of the P2MP LSP;
a circuit logic configured to select the backup ingress node for the P2MP LSP based on the network's topology and a set of constraints that are located in the request message; and
a transmitter configured to send a reply message comprising the computed backup ingress node when the backup ingress node is selected successfully,
wherein the backup ingress node is a root node of a backup sub tree,
wherein the request message comprises a plurality of flags,
wherein one of the flags is a backup ingress bit flag, and
wherein the backup sub tree extends from the backup ingress node to one or more next-hop nodes from the ingress node along the P2MP LSP.

12. The network component of claim 11, wherein the set of constraints comprise bandwidth limitation and information about an external node that transmits traffic to the ingress node of the P2MP LSP, and wherein the network component is not located along the P2MP LSP.

13. The network component of claim 11, wherein the transmitter is configured to send a reply message that indicates a reason for failure to select the backup ingress node when the backup ingress node is not selected successfully.

14. The network component of claim 13, wherein the reply message comprises a NO-PATH object that indicates a reason of failure to compute the backup ingress node, wherein the NO-PATH object comprises a nature of issue field, a flags field that comprises a capability (C) flag, a first optional type-length-value (TLV), and one or more second optional TLVs, and wherein the first optional TLV comprises a type field, a length field, and a second flags field that comprises a reachability (R) flag.

15. The network component of claim 14, wherein the R flag is set to indicate a reachability issue with one or more next-hops of the ingress node of the P2MP LSP from a candidate backup ingress node, and wherein the NO-PATH object comprises a plurality of unreachable Internet Protocol (IP) version four (IPv4) or IP version six (IPv6) next-hops TLVs that list IP addresses of the next-hops of the ingress node of the P2MP LSP that are not reachable from the candidate backup ingress node.

16. The network component of claim 11, wherein the reply message comprises a PCE Protocol (PCEP) Error object that indicates an error related to the backup ingress node computation, and wherein the PCEP Error object comprises a flags field, an error-type field, an error-value field, and one or more optional type-length-values (TLVs).

17. A network component comprising:
a receiver configured to receive a request message for computing a backup ingress node of a Point-to-Multipoint (P2MP) Label Switched Path (LSP) in a network to protect the ingress of the P2MP LSP, wherein the backup ingress node is an ingress node of a backup P2MP sub tree, and wherein the backup P2MP sub tree does not extend across the network;
a circuit logic configured to attempt computing the backup ingress node for the P2MP LSP based on the network's topology and a set of constraints in the request message; and
a transmitter configured to send a reply message comprising the computed backup ingress node if the backup ingress node is computed successfully,
wherein the request message, the reply message, or both comprise a request parameter (RP) object that comprises a reserved field, a plurality of flags, a request identification (ID) number, and one or more optional type-length-values (TLVs), and
wherein the flags comprise a backup ingress bit (I) flag, a fragmentation bit (F) flag, a P2MP bit (N) flag, an Explicit Route Object (ERO) compression bit (E) flag, a strict/loose bit (O) flag, a bi-directional bit (B) flag, a re-optimization (R) flag, and a plurality of priority bit (P) flags.

18. A method comprising:
exchanging a capability information with a path computation client (PCC) during a session establishment that signals a path computation element (PCE) is capable to compute a backup ingress node;
receiving a request message for computing the backup ingress node for an ingress node along a Point-to-Multipoint (P2MP) Label Switched Path (LSP);
computing the backup ingress node; and
sending a reply message to the PCC in response to the request message for computing the backup ingress node,
wherein the reply message comprises the backup ingress node information,
wherein the backup ingress node is a root node of a backup path,
wherein the request message comprises a plurality of constraints and a plurality of flags,
wherein one of the flags is a backup ingress bit flag, and
wherein the backup path is a path from the backup ingress node to one or more next-hop nodes of the ingress node along the P2MP LSP.

19. The method of claim 18, wherein the capability information is exchanged using a PCE capability sub type-length-value (TLV) in a PCE Discovery (PCED) TLV, wherein the PCE capability sub TLV comprises a type field, a length field, and a value field that comprises a first flag and a second flag, and wherein the first flag is set to indicate that the PCE is capable of computing the backup ingress node for the P2MP LSP and the second flag is set to indicate that the PCE is capable of computing a backup ingress node for a Point-to-Point (P2P) LSP.

20. The method of claim 18, wherein the capability information is exchanged using a PCE capability TLV in an open message to discover the capability information, and wherein the PCE capability TLV comprises a type field, a length field, and a value field that indicates a capability to compute the backup ingress node for the ingress node along the P2MP LSP.

* * * * *